(12) United States Patent
Kondo

(10) Patent No.: US 7,483,709 B2
(45) Date of Patent: Jan. 27, 2009

(54) MOBILE COMMUNICATION SYSTEM WITH IMPROVED TRACKABILITY OF TRANSMISSION POWER CONTROL

(75) Inventor: Takayuki Kondo, Minato-ku (JP)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 10/564,719

(22) PCT Filed: Jul. 7, 2004

(86) PCT No.: PCT/JP2004/009625
§ 371 (c)(1),
(2), (4) Date: Jan. 17, 2006

(87) PCT Pub. No.: WO2005/008921

PCT Pub. Date: Jan. 27, 2005

(65) Prior Publication Data
US 2006/0172757 A1 Aug. 3, 2006

(30) Foreign Application Priority Data
Jul. 18, 2003 (JP) ............................ 2003-276662

(51) Int. Cl.
H04B 7/00 (2006.01)
H04Q 7/20 (2006.01)

(52) U.S. Cl. .................. 455/522; 455/13.4; 455/69; 455/436; 455/456.5; 455/517; 370/331

(58) Field of Classification Search ............... 455/522, 455/13.4, 69, 436, 442, 456.5, 517, 524, 455/560; 370/331, 332, 333
See application file for complete search history.

(56) References Cited

U.S. PATENT DOCUMENTS 5,722,044 A * 2/1998 Padovani et al. ............. 455/443
6,026,081 A * 2/2000 Hamabe ...................... 370/335
6,070,084 A * 5/2000 Hamabe ...................... 455/522
6,198,937 B1 * 3/2001 DeClerck et al. ............ 455/517

(Continued)

FOREIGN PATENT DOCUMENTS

EP       0 946 070 A2    9/1999
JP       2000-269881 A   9/2000

OTHER PUBLICATIONS

3GPP TS 25.214 V3.7.0, Release 199, 5.1.2 DPCCH/DPDCH, Jun. 2001.

Primary Examiner—Matthew D. Anderson
Assistant Examiner—Shaima Q Aminzay
(74) Attorney, Agent, or Firm—Sughrue Mion, PLLC

(57) ABSTRACT

There is provided a transmission power control method in which trackability of up-transmission power control is improved using up-transmission power instruction information from radio base stations having down-links of a predetermined quality or more, and a mobile communication system and a mobile station apparatus that use this method. Radio base stations 11, 12 transmit up-transmission power instruction information for instructing mobile station 13 to lower up-transmission power when a receiving level of the up-link is not lower than an up-target value. Also, when the receiving level is below the up-target value, radio base stations 11, 12 transmit up-transmission power instruction information for instructing that up-transmission power be raised. Mobile station 13 determines up-transmission power using only up link transmission power instruction information from radio base stations having down-links of a predetermined communication quality or more, from among up-transmission power instruction information received from the plurality of radio base stations 11, 12 connected through soft handover.

8 Claims, 2 Drawing Sheets

U.S. PATENT DOCUMENTS

| | | | |
|---|---|---|---|
| 6,351,651 B1 * | 2/2002 | Hamabe et al. | 455/522 |
| 6,405,021 B1 * | 6/2002 | Hamabe | 455/69 |
| 6,418,322 B1 * | 7/2002 | Kim et al. | 455/522 |
| 6,526,028 B1 * | 2/2003 | Kondo | 370/333 |
| 6,539,226 B1 * | 3/2003 | Furukawa et al. | 455/442 |
| 6,937,583 B1 * | 8/2005 | Czaja et al. | 370/331 |
| 2003/0076796 A1 * | 4/2003 | Kondo | 370/332 |
| 2005/0277419 A1 * | 12/2005 | Takano et al. | 455/442 |

* cited by examiner

MOBILE COMMUNICATION SYSTEM WITH IMPROVED TRACKABILITY OF TRANSMISSION POWER CONTROL

TECHNICAL FIELD

The present invention relates to a mobile communication system for performing transmission power control.

BACKGROUND ART

In a CDMA (Code Division Multiple Access) mobile communication system, a plurality of mobile stations use the same frequency band. Usually, the mobile stations each have a different distance from a radio base station. Also, for a mobile station, the radio waves of a radio link from another mobile station cause interference. Therefore, it is preferable for the entire system that the transmission power of each apparatus is minimized within limits in which a predetermined communication quality can be ensured. For this reason, in the CDMA mobile communication system, transmission power for radio base stations and mobile stations is controlled for each mobile station by Inner Loop Power Control (for example, refer to 3PP TS 25.214 V3.7.0, 3rd Generation Partnership Project; Technical Specification Group Radio Access Network; "Physical layer Procedures (FDD)", June 2001, pp. 12-20).

In the CDMA mobile communication system, soft handover is used for switching radio base stations. In soft handover, one mobile station can connect with a plurality of radio base stations. With this system, it is possible to switch radio base stations without disconnection. Also, soft handover contributes to maintaining communication quality by due to the effects of site diversity.

Referring to FIG. 1, in a conventional CDMA mobile communication system, mobile station 93 connects with both radio base station 91 and radio base station 92 by radio links through soft handover. Radio links from radio base stations 91, 92 to mobile station 93 are DL (Down Link). And, radio links from mobile station 93 to radio base stations 91, 92 are UL (Up Link).

Explanations will be given of transmission power control with reference to FIG. 1.

A UL target receiving level is given to radio base stations 91, 92, for example, from a base station control apparatus not shown. Radio base stations 91, 92 control transmission power from mobile stations 93 to ULs so that UL signal receiving levels from mobile stations 93 are close to the UL target receiving level. Incidentally, the UL receiving level and the UL target receiving level are indicated by SIR (Signal to Interference Ratio).

Specifically, radio base stations 91, 92 receive UL signals from mobile station 93 and measure the UL receiving levels. Then, radio base stations 91, 92 compare the UL receiving levels with the UL target receiving level. Subsequently, radio base stations 91, 92 instruct mobile stations 93 to raise transmission power for ULs when the UL receiving levels are smaller than the UL target receiving level. Also, radio base stations 91, 92 instruct mobile station 93 to lower transmission power for the ULs when the UL receiving levels are larger than the UL target receiving levels.

Further, radio base stations 91, 92 change transmission power for DLs in accordance with instructions from mobile station 93. Specifically, radio base stations 91, 92 raise transmission power for DLs when mobile station 93 instructs radio base stations 91, 92 to raise transmission power. Radio base stations 91, 92 lower transmission power for the DLs when mobile station 93 instructs radio base stations 91, 92 to lower transmission power.

Mobile station 93 controls transmission power from radio base stations 91, 92 to DLs so that DL signal receiving levels from radio base stations 91, 92 are close to the predetermined DL target receiving level. Also, the DL receiving level and the predetermined UL receiving level are indicated by SIR or the like.

Specifically, mobile station 93 receives DL signals from radio base stations 91, 92 to synthesize or select the DL signals, and measures the DL receiving levels. Then, mobile station 93 compares the DL receiving levels with the DL target receiving level. Subsequently, mobile station 93 instructs radio base stations 91, 92 to raise the transmission power for DLs when the DL receiving levels are smaller than the DL target receiving level. Also, mobile station 93 instructs radio base stations 91, 92 to lower the transmission power for DLs when the DL receiving levels are larger than the DL target receiving levels.

Further, mobile station 93 changes transmission power for ULs in accordance with instructions from radio base stations 91, 92. Specifically, mobile station 93 raises transmission power for DLs when both radio base stations 91, 92 instruct mobile station 93 to raise transmission power. Mobile station 93 lowers transmission power for ULs when at least one of radio base stations 91, 92 instructs mobile station 93 to lower transmission power.

DISCLOSURE OF INVENTION

In conventional transmission power control, there is a possibility that transmission power is not appropriately controlled. Hereinafter, this possibility will be explained.

As shown in FIG. 1, it is assumed that mobile station 93 is closer to radio base station 92 than radio base station 91 and the transmission power of radio base station 91 is larger than that of radio base station 92.

When attention is paid to DL, the transmission power of radio base station 91 is large, and thus there is a possibility that mobile station 93 can receive a signal having sufficient quality from radio base station 91 (for example, Bit Error Rate is not less than $10^{-6}$) while mobile station 93 cannot receive a signal having sufficient quality from radio base station 92. Simultaneously, when an attention is paid to the UL, mobile station 93 is close to radio base station 92, and thus there is a possibility that radio base station 92 can receive a signal having sufficient quality from mobile station 93 while radio base station 91 cannot receive a signal that has sufficient quality from mobile station 93.

Radio base station 91 instructs mobile station 93 to raise the transmission power because radio base station 91 cannot receive UL signals with sufficient quality. On the other hand, radio base station 92 instructs mobile station 93 to lower the transmission power because radio base station 92 can receive UL signals with sufficient quality. DL from radio base station 92 to mobile station 93 is not in the sufficient quality. However, the amount of information in the control instructions is small and these instructions are repeatedly transmitted, and thus control instructions are communicated so that to some extent they can have an effect on the determination of transmission power.

Mobile station 93 that receives these control instructions lowers the transmission power since the instructions from at least one radio base station (in this case, radio base station 92) instruct the transmission power to be lowered. Accordingly, the transmission power for ULs of mobile station 93 is lowered. As a result, a situation is maintained in which signals concerning D1 from radio base station 91 are dominant, and signals concerning UL to radio base station 92 are dominant.

Under this condition, the control instructions from radio base station 92 to mobile station 93 are not sufficiently communicated, and thus there is a possibility that the transmission power control for UL is degraded in trackability and is not in order. For example, when the UL transmission condition from mobile station 93 to radio base station 92 worsens due to fading or shadowing, control for raising the transmission power of mobile station 93 cannot track this worsening condition. Accordingly, in the worst case, a call is disconnected. Similarly, control instructions from mobile station 93 to radio base station 91 are not sufficiently, communicated, and thus the transmission power control for DL from radio base station 91 is degraded in trackability.

The present invention has its object to provide a transmission power control method with improved trackability, and a mobile communication system and a mobile station apparatus that use this method.

To achieve the above-mentioned object, a mobile communication system according to the present invention is a mobile communication system performing soft handover and transmission power control and is provided with a plurality of radio base stations and a mobile station.

The radio base station transmits up-transmission power instruction information for instructing that up-transmission power be lowered to a down-link when the receiving level of an up-link is not less than a predetermined up-target value, and transmits up-transmission power instruction information for instructing that up-transmission power be raised to the down-link when the receiving level is below the predetermined up-target value.

The mobile station determines up-transmission power using only the up-transmission power instruction information from the radio base station having down-links with a predetermined communication quality or more, from among up-transmission power instruction information received from the plurality of radio base stations connected through the soft handover.

According to the present invention, during the soft handover, the mobile station selects the up-transmission power instruction information from the radio base station having down-links with a predetermined communication quality or more, from among up-transmission power instruction information received from the plurality of radio base stations, and determines the transmission power using only the selected up-transmission power instruction information. Accordingly, signals are communicated between the radio base station and the mobile station smoothly, and this thereby improves trackability of power in transmission power control.

BEST MODE FOR CARRYING OUT THE INVENTION

Explanations will be given of an embodiment according to the present invention.

Figure 1:
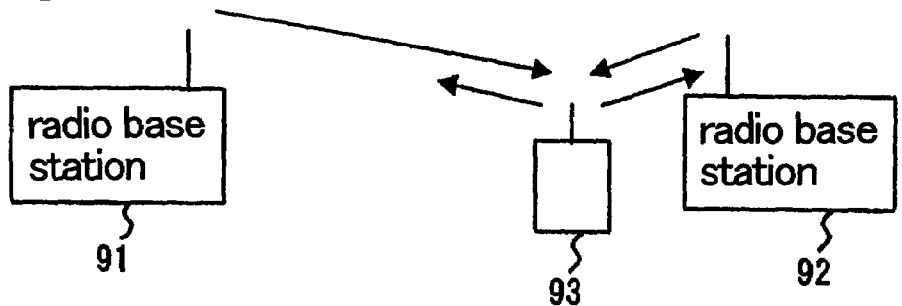
FIG. 1 is a view showing a configuration of a conventional CDMA mobile communication system.
Figure 2:
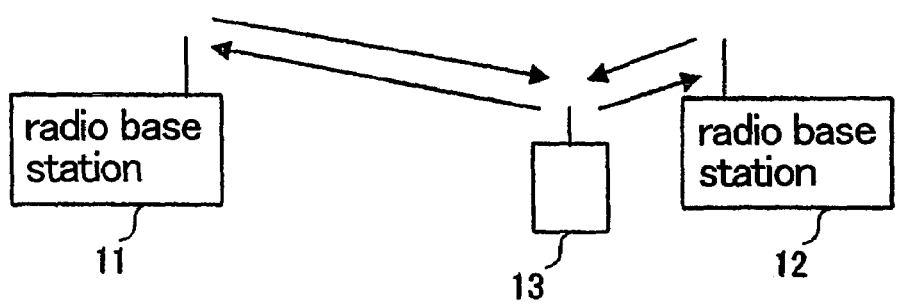
FIG. 2 is a view showing a configuration of a mobile communication system of an embodiment according to the present invention.

Referring to FIG. 2, a mobile communication system of the embodiment is provided with radio base stations 11, 12 and mobile station 13. The mobile communication system of the embodiment is also provided with functions of soft handover and transmission power control.

Radio base stations 11, 12 connect with mobile station 13 by radio links and provide communication paths between mobile station 13 and a person with another terminal.

Mobile station 13 is a portable terminal, is connected with a radio base station within a positioned area by radio links, and establishes communication with the person having the other terminal via the radio base station. In soft handover, mobile station 13 is capable of connecting with a plurality of radio base stations simultaneously. In FIG. 2, mobile station 13 connects with both radio base station 11 and radio base station 12 simultaneously.

Figure 3:
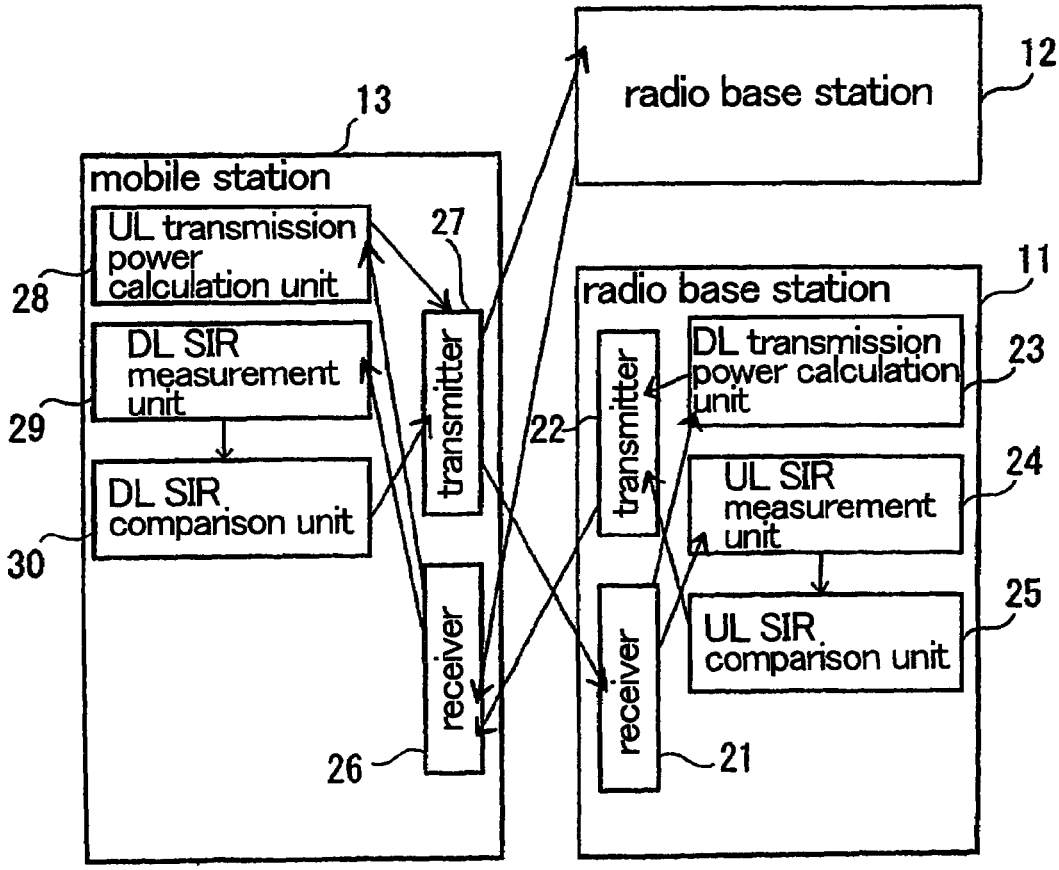
FIG. 3 is a block diagram showing configurations of radio base stations and a mobile station shown in FIG. 1.

FIG. 3 is a block diagram showing the configurations of the radio base stations and the mobile station shown in FIG. 2. The configuration of radio base station 11 is similar to that of radio base station 12.

Radio base station 11 is provided with receiver 21, transmitter 22, DL (Down Link) transmission power calculation unit 23, UL (Up Link) SIR measurement unit 24, and UL (Up Link) SIR comparison unit 25.

Receiver 21 receives UL (Up Link) signals from mobile station 13 and transmits the UL signals to DL transmission power calculation unit 23 and UL SIR measurement unit 24.

DL transmission power calculation unit 23 extracts down-transmission power instruction information from signals received from the receiver 21, and calculates a value of down-transmission power to be used in transmitter 22 based on the down-transmission power instruction information and informs transmitter 22 of the value. The down-transmission power instruction information is information of instructions for raising or lowering transmission power from the mobile station to the radio base station. For example, a plurality of transmission power values at different levels is previously set for radio base station 11. When DL transmission power calculation unit 23 receives an instruction from mobile station 13 for raising the transmission power, DL transmission power calculation unit 23 acquires a transmission power value higher than the current value by one level and gives it to transmitter 22. A case of lowering the transmission power is also similar. When DL transmission power calculation unit 23 receives an instruction from mobile station 13 for lowering the transmission power, DL transmission power calculation unit 23 acquires a transmission power value lower than the current value by one level and gives it to transmitter 22.

UL SIR measurement unit 24 measures the receiving level of UL signals from mobile station 13 and informs UL SIR comparison unit 25 of the receiving level. As an example, a UL receiving level is designated by SIR, and is called UL SIR (Up Link SIR).

UL SIR comparison unit 25 compares UL SIR from UL SIR measurement unit 24 with a predetermined UL target receiving level (hereinafter, called UL target SIR) and transmits up-transmission power instruction information based on the comparison result to transmitter 22. UL target SIR is a parameter which can be freely changed and is previously given from a base station control apparatus not shown. Alternatively, UL target SIR may be a fixed value.

At this time, UL SIR comparison unit 25 transmits up-transmission power instruction information for raising up-transmission power to transmitter 22 when UL SIR is smaller than UL target SIR. Also, UL SIR comparison unit 25 transmits up-transmission power instruction information for lowering up-transmission power to transmitter 22 when UL SIR is larger than UL target SIR.

Transmitter 22 transmits up-transmission power instruction information from UL SIR comparison unit 25 to mobile station 13. Also, transmitter 22 transmits a signal to DL at the transmission power value instructed by DL transmission power calculation unit 23.

Mobile station 13 is provided with receiver 26, transmitter 27, UL (Up Link) transmission power calculation unit 28, DL (Down Link) SIR measurement unit 29, and DL (Down Link) SIR comparison unit 30.

Receiver 26 receives DL signals from the radio base station and transmits the DL signals to UL transmission power calculation unit 28 and DL SIR measurement unit 29. In the soft handover, receiver 26 receives signals from a plurality of radio base stations (radio base stations 11, 12 in FIG. 2) and transmits the signals to UL transmission power calculation unit 28 and DL SIR measurement unit 29.

UL transmission power calculation unit 28 extracts up-transmission power instruction information from the signals received from the receiver 26, and calculates the value of up-transmission power to be used in transmitter 27 based on the up-transmission power instruction information and informs transmitter 22 of the value. The up-transmission power information is information of instructions from the radio base station to the mobile station for raising or lowering transmission power. For example, a plurality of transmission power values at different levels is previously set for mobile station 13. When UL transmission power calculation unit 28 decides to raise the transmission power based on instructions from the radio base station, UL transmission power calculation unit 28 acquires a transmission power value higher than the current value by one stage and gives it to transmitter 22. A case of lowering the transmission power is also similar. When UL transmission power calculation unit 28 determines to lower the transmission power based on an instruction from the radio base station, UL transmission power calculation unit 28 acquires a transmission power value lower than the current value by one level and gives it to transmitter 22.

During soft handover, UL transmission power calculation unit 23 receives up-transmission power instruction signals from a plurality of radio base stations (in the embodiment, radio base stations 11, 12). At this time, first, DL transmission power calculation unit 23 selects up-transmission power instruction information extracted from DLs of a predetermined communication quality or more. In this case, the predetermined communication quality is a parameter which is designated by BER (Bit Error Rate) and which is changeable. For example, $BER=10^{-6}$ is satisfied. Then, DL transmission power calculation unit 23 decides to raise the transmission power when all pieces of the selected up-transmission power instruction information instruct that the transmission power to be raised. Also, DL transmission power calculation unit 23 decides to lower the transmission power when at least one piece of selected UL transmission power instruction information instructs that the transmission power be lowered. Incidentally, in the embodiment, up-transmission power instruction information is selected by the communication quality such as BER, however, the receiving level such as SIR may be used.

DL SIR measurement unit 29 measures the receiving level of DL signals from radio base stations 11, 12 and informs DL SIR comparison unit 30 of the receiving level. As an example, a down-link receiving level is designated by SIR, and is called DL SIR (Down Link SIR).

DL SIR comparison unit 30 compares DL SIR from DL SIR measurement unit 29 with a predetermined down link target receiving level (hereinafter, called DL target SIR) and transmits DL transmission power instruction information based on the comparison result to transmitter 27. DL target SIR may be a parameter that can be being freely changed and may be a fixed value.

At this time, DL SIR comparison unit 30 transmits down-transmission power instruction information for raising down-transmission power to transmitter 27 when the DL SIR is smaller than the UL target SIR. Also, DL SIR comparison unit 30 transmits down-transmission power instruction information for raising down-transmission power to transmitter 27 when the DL SIR is larger than the DL target SIR.

Transmitter 27 transmits down-transmission power instruction information from DL SIR comparison unit 30 to radio base stations 11, 12. Also, transmitter 27 transmits a signal to UL at the transmission power value instructed by UL transmission power calculation unit 28.

Explanations will be given of up-transmission power control during soft handover in the mobile communication system according to the embodiment.

As shown in FIG. 2, mobile station 13 connects with both radio base station 11 and radio base station 12 by the soft handover.

First, radio base stations 11, 12 measure the UL SIR of ULs from mobile station 13. Then, radio base stations 11, 12 compare the measured UL SIR with the predetermined UL target SIR and decides to instruct mobile station 13 whether to raise or to lower the transmission power. Then, radio base stations 11, 12 transmit the determined instructions to mobile station 13 as up-transmission power instruction information.

Figure 4:
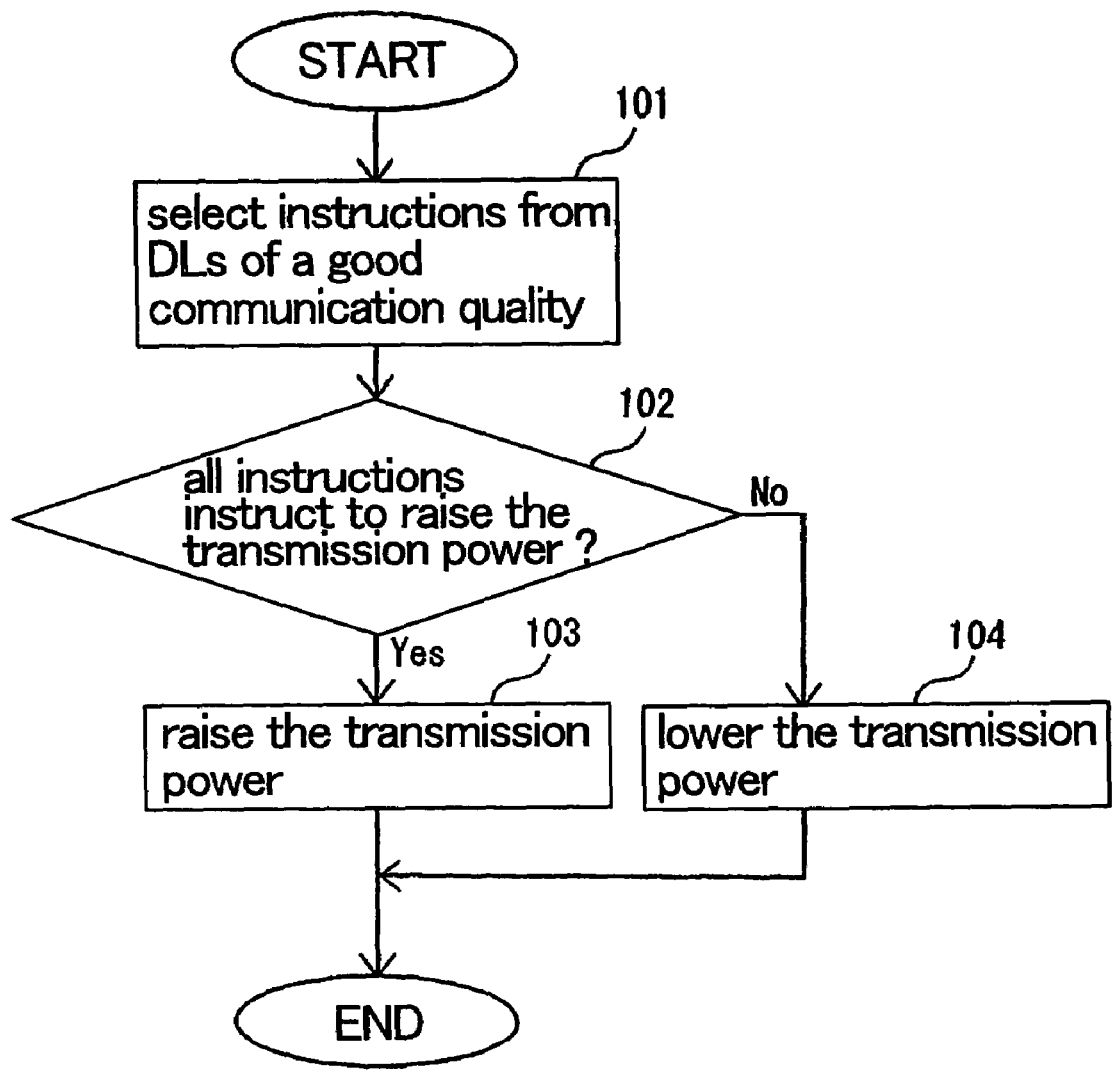
FIG. 4 is a flow chart showing an up-transmission power control operation in the mobile station.

Referring to FIG. 4, mobile station 13 which has received the up-transmission power instruction information from radio base stations 11, 12 selects up-transmission power instruction information from DLs having a good communication quality (Step 101). Then, it is determined whether or not all pieces of the selected up-transmission power instruction information are instructions for raising the transmission power (Step 102).

When all pieces of the up-transmission power instruction information are instructions for raising the transmission power, mobile station 13 raises the transmission power to ULs (Step 103). When at least one piece of up-transmission power instruction information is an instruction for lowering the transmission power, mobile station 13 lowers the transmission power to ULs (Step 104).

For example, it is assumed that the DL from radio base station 11 to mobile station 13 is in the predetermined communication quality or more while the DL from radio base station 12 to mobile station 13 is below the predetermined communication quality. In this case, mobile station 13 only selects up-transmission instruction information from radio base station 11, from among up-transmission instruction information from radio base stations 11, 12 and determines the transmission power to ULs. As a result, signals from mobile station 13 to ULs can be received by radio base station 11 at a sufficient receiving level. Both the UL and the DL are in the predetermined communication quality or more between radio base station 11 and mobile station 13, and therefore, the trackability of transmission power control in UL and DL is improved.

As described above, according to the mobile communication system of the embodiment, during soft handover, UL transmission power calculation unit 28 in mobile station 13 selects up-transmission power instruction information from radio base station having DL with the predetermined quality or more, from among up-transmission power instruction information from the plurality of radio base stations, and determines the transmission power for transmitter 27 using only the selected up-transmission power instruction information. Accordingly, signals are communicated smoothly between radio base station 11 and mobile station 13 and trackability of power in transmission power control is improved.

The invention claimed is:

1. A transmission power control method in a mobile communication system in which a mobile station connects with a plurality of radio base stations simultaneously;

in said radio base station, said method comprising:
   a step of measuring a receiving level of an up-link from the mobile station; and
   a step of transmitting up-transmission power instruction information for instructing that up-transmission power be lowered to the mobile station when the receiving level is not less than a predetermined target value and of transmitting up-transmission power instruction information for instructing that up-transmission power be raised to the mobile station when the receiving level is below the predetermined target value:

in the mobile station, said method comprising:
   a step of receiving the up-transmission power instruction information from the plurality of radio base stations connected thereto; and
   a step of determining up-transmission power using only up-transmission power instruction information from radio base stations having down-links of at least a predetermined communication quality, from among the up-transmission power instruction information received from the radio base stations.

2. The transmission power control method according to claim 1, wherein, in determining up-transmission power in the mobile terminal, a determination is made to raise the up-transmission power when all pieces of the up-transmission power instruction information from the radio base stations having down-links of at least the predetermined quality are instructions for raising the transmission power, and a determination is made to lower the up-transmission power when at least one piece of up-transmission power instruction information is an instruction for lowering the transmission power.

3. A mobile communication system performing soft handover and transmission power control, comprising:
   a plurality of radio base stations for transmitting up-transmission power instruction information for lowering up-transmission power to a down-link when the receiving level of an up-link is not less than a predetermined up-target value, and for transmitting up-transmission power instruction information for raising up-transmission power to the down-link when the receiving level is below the predetermined up-target value; and
   a mobile station for determining up-transmission power using only the up-transmission power instruction information received from radio base stations having down-links of at least a predetermined communication quality, from among the up-transmission power instruction information received from the plurality of radio base stations that are connected by soft handover.

4. The mobile communication system according to claim 3, wherein, in determining up-transmission power by the mobile station, a determination is made to raise the up-transmission power when all pieces of the up-transmission power instruction information from radio base stations having down-links of at least the predetermined quality are instructions for raising the transmission power, and a determination is made to lower the up-transmission power when at least one piece of up-transmission power instruction information is an instruction for lowering the transmission power.

5. The mobile communication system according to claim 3 or 4, wherein said mobile station transmits down-transmission power instruction information for instructing that down-transmission power be lowered to an up-link when the receiving level of the down-link is not less than a predetermined down target value, and transmits down-transmission power instruction information for instructing that down-transmission power be raised to the up-link when the receiving level is below the predetermined down target value; and wherein said radio base station determines down-transmission power using the down-transmission power instruction information received from the mobile station connected thereto.

6. A mobile station apparatus used in a mobile communication system performing soft handover and transmission power control, comprising:
   a receiver for receiving signals of down-links from a plurality of radio base stations connected by soft handover;
   an up-link transmission power calculation unit for determining up-transmission power using only up-transmission power instruction information extracted from signals received from down-links of at least a predetermined communication quality, from among signals received by the receiver; and
   a transmitter for transmitting the signals to the up-links with the up-transmission power determined by the up-link transmission power calculation unit.

7. The mobile station apparatus according to claim 6, wherein, in determining up-transmission power by the up-link transmission power calculation unit, a determination is made to raise the up-transmission power when all pieces of the up-transmission power instruction information extracted from signals received from the down-links of at least the predetermined quality are instructions for raising the transmission power, and a determination is made to lower the up-transmission power when at least one piece of up-transmission power instruction information is an instruction for lowering the up-transmission power.

8. The mobile station apparatus according to claim 6 or 7 further comprising:
   a down-link receiving level measurement unit for measuring a receiving level of the down-link in the receiver; and
   a down link receiving level comparison unit for transmitting down-transmission power instruction information for instructing that the down-transmission power be lowered to the up-link via the transmitter when the receiving level measured by the down-link receiving level measurement unit is not lower than a predetermined target value, and for transmitting down-transmission power instruction information for instructing that the down-transmission power be raised to the up-link via the transmitter when the receiving level measured by the down-link receiving level measurement unit is below the predetermined target value.

* * * * *